Feb. 12, 1963   G. O. FREDRICKSON   3,077,555
ELECTRIC MOTOR
Filed July 9, 1958                                     4 Sheets-Sheet 1
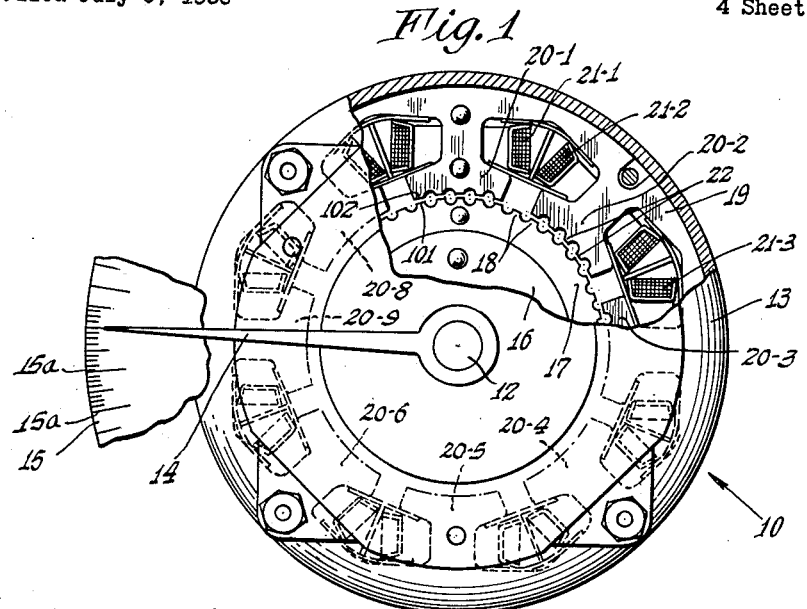
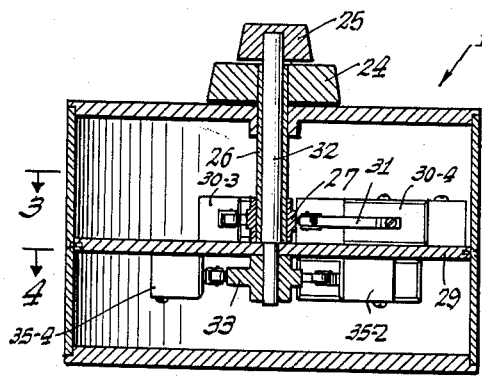
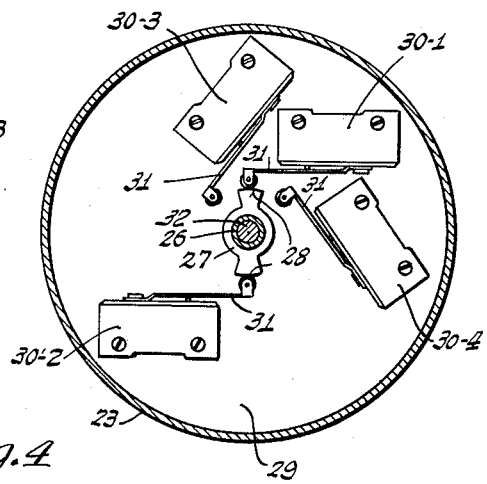
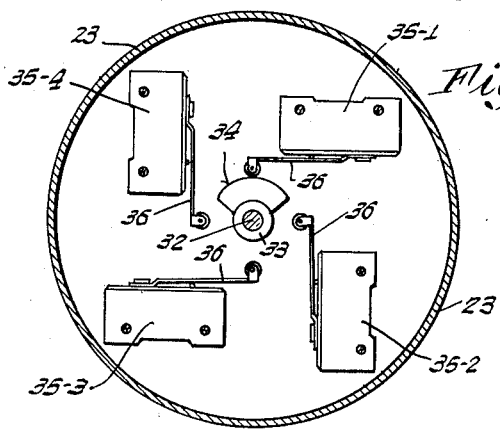
INVENTOR.
Gustav O. Fredrickson
BY
Johnson and Kline
ATTORNEYS INVENTOR.
Gustav O. Fredrickson
BY
Johnson and Kline
ATTORNEYS Feb. 12, 1963  G. O. FREDRICKSON  3,077,555
ELECTRIC MOTOR
Filed July 9, 1958  4 Sheets-Sheet 3
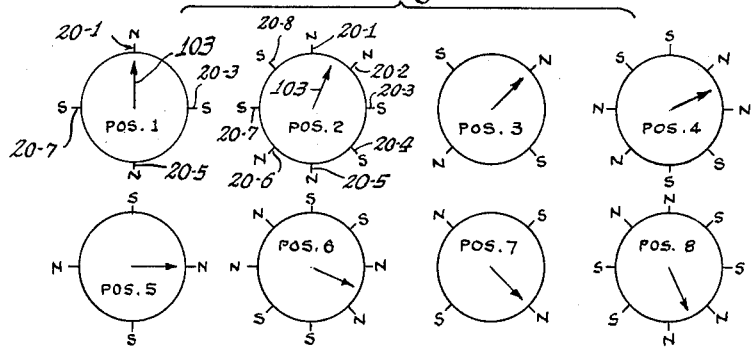
Fig. 6
Fig. 7
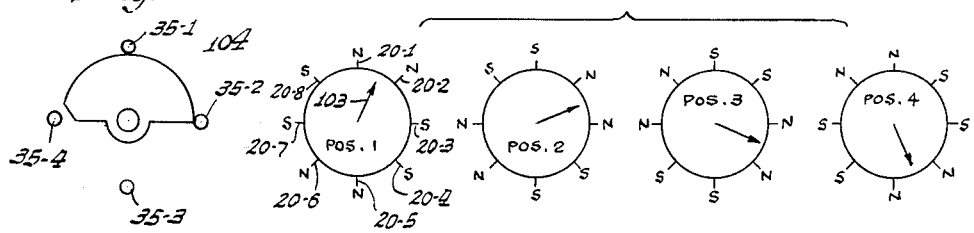
Fig. 8
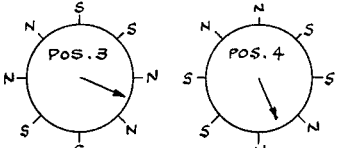
Fig. 9
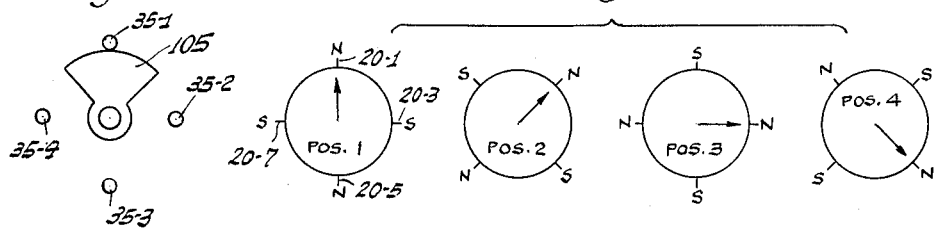
Fig. 10
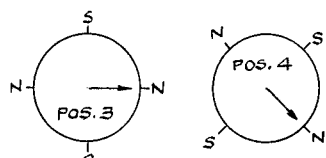
INVENTOR.
Gustav O. Fredrickson
BY
Johnson and Kline
ATTORNEYS Feb. 12, 1963

G. O. FREDRICKSON 3,077,555

ELECTRIC MOTOR

Filed July 9, 1958

INVENTOR.
Gustav O. Fredrickson
BY
Johnson and Kline
ATTORNEYS

United States Patent Office 3,077,555
Patented Feb. 12, 1963

3,077,555
ELECTRIC MOTOR
Gustav O. Fredrickson, Southington, Conn., assignor to The Superior Electric Company, Bristol, Conn., a corporation of Connecticut
Filed July 9, 1958, Ser. No. 747,432
10 Claims. (Cl. 318—254)

The present invention relates to a driving unit comprising an electric motor and a control device therefor for producing an output which may be either continuously or incrementally rotatable or stopped and maintained stationary at selected positions.

The electric motor of the driving unit of the present invention, as specifically disclosed, is of the synchronous inductor type having a permanent magnet rotor and a stator composed of a plurality of poles with a winding for magnetizing each pole. Both the rotor and the stator poles have their coacting peripheries toothed and when the windings are energized by alternating current the rotor revolves one rotor tooth pitch for each complete reversal of current in the windings. The output of the unit in the specific embodiment shown is the motor shaft to which of course, if desired, mechanical motion converters may be attached.

An object of the present invention is to provide a driving unit having an electric motor in which the shaft of the motor may be inched or rotatably moved in small increments.

Another object of the present invention is to provide a driving unit of the above type for the motor shaft to be incrementally moved in either direction.

A further object of the present invention is to provide in a driving unit having an electric motor for holding stationary the rotor of the motor by maintaining the motor energized.

In carrying out the present invention there is provided a motor of the above type and a control device connected between the motor windings and a source of alternating current. The control device includes a first switch means which is used to connect the windings of the motor to the source of alternating current. This switch means has three positions, one position used when the motor is moved in small increments; a second position for rotating the shaft continuously in one direction; and a third position for rotating the shaft continuously in the opposite direction.

There is also provided a second switch means having a plurality of positions for enabling selective energization of the windings of the motor to thereby advance the rotor in small increments as the switch means is manipulated. The switches connect a source of unidirectional current to selected windings and the current may be directed in one direction or the other through the windings by the switch so that continuous operation of the second switch means causes the shaft to be incrementally advanced. The switch means is operable in two directions and according to the present invention, so is the motor shaft.

When the motor is energized under the control of the second switch means and the means is maintained stationary, unidirectional current flows through selected windings; however since the rotor has assumed the position dictated by the relative polarity of the stator poles and the rotor magnets, there is no movement of the rotor, but the rotor is held in this position by the energized windings and resists efforts to move therefrom. Thus the motor has its rotor shaft maintained in a selected position when neither the continuously rotating current nor the unidirectional current is changing.

Other features and advantages will hereinafter appear.

In the drawing:

FIGURE 1 is an end elevation, partly in section, of the motor of the present invention.

FIG. 2 is a section of the control device for the motor.

FIG. 3 is a view taken on the line 3—3 of FIG. 2.

FIG. 4 is a view taken on the line 4—4 of FIG. 2.

FIG. 6 is a diagrammatical illustration of the polarity of the poles of the stator for different positions of the second switch means.

FIG. 7 is a further embodiment of selected positions of a second switch means.

FIG. 8 is a diagrammatical illustration of the polarity of the poles of the stator for different positions of the embodiment of the second switch means shown in FIG. 7.

FIG. 9 is a further embodiment of selected positions of a second switch means.

FIG. 10 is a diagrammatical illustration similar to FIGS. 6 and 8 of the embodiment of the second switch means shown in FIG. 9.

Figure 5:
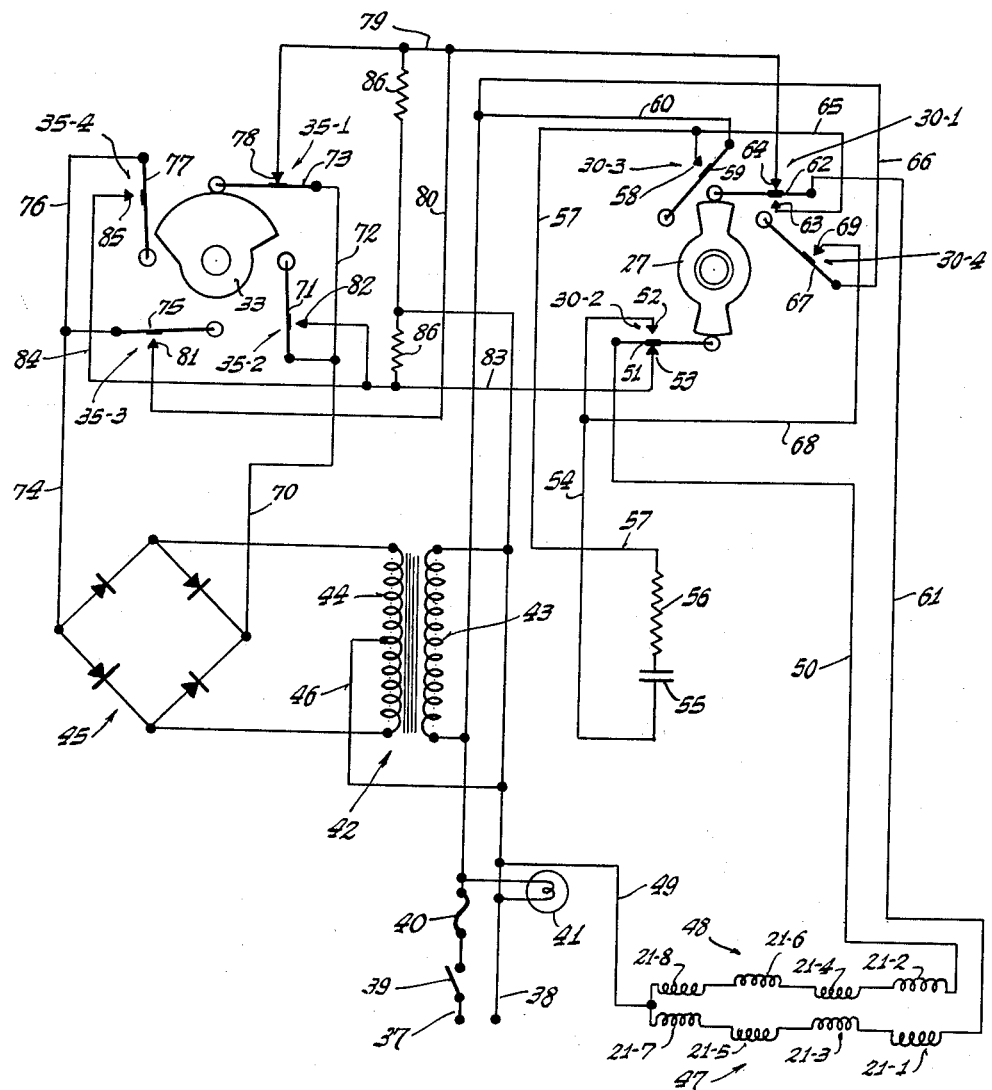
FIG. 5 is a schematic diagram of the electrical connections of the present invention.

Referring to the drawing, the motor is generally indicated by the reference numeral 10 and the control device by the numeral 11. These two components constitute the drive unit of the present invention. The motor has a rotatable shaft 12 projecting beyond a cylindrical motor casing 13 and in the embodiment shown there is a pointer 14 attached thereto and a scale 15 cooperating with the pointer. The output of the unit is the shaft 12 to which mechanisms to be driven may be secured.

The rotor of the motor has a cylindrical permanent magnet 16, magnetized axially, secured on the shaft with ferromagnetic end caps 17 secured on the shaft at each end of the magnet and these caps are accordingly polarized north and south by the magnet. The peripheries of the end caps are toothed to provide a plurality of teeth as at 18.

Figure 11:
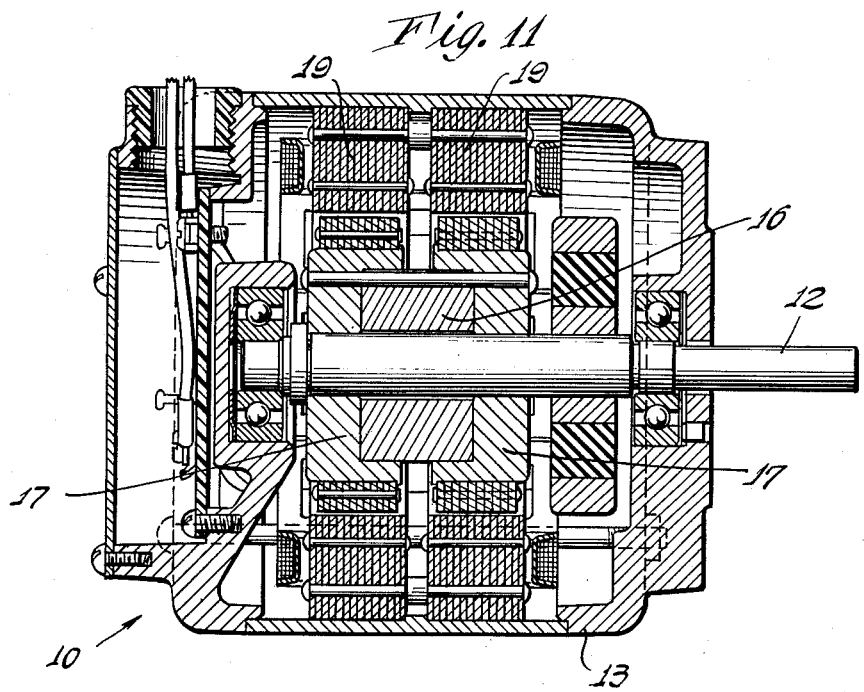
FIG. 11 is a section of the motor taken along the axis of its shaft.

The stator has two axially aligned stator rings 19 formed of laminated ferromagnetic material and positioned in the casings 13 so that each is radially aligned to surround an end cap. The rings 19 are formed, in the specific embodiment shown, to have eight poles 20-1 through 20-8 though, of course, if desired any number of poles which are multiples of two may be utilized. Each pole has a winding 21-1 through 21-8 associated therewith respectively for magnetizing the pole according to the direction of electrical current in the winding. The pole pieces are formed to provide teeth 22 at their inner periphery. The teeth 18 and 22 of the rotor and stator respectively may have the same pitch or there may be a slight variation caused by there being more teeth in one than the other as for example the prime ratio of rotor teeth may be one greater than the prime ratio of stator teeth by one tooth. In the present embodiment, the rotor has two more teeth on its periphery than designed for the stator circle formed by the peripheries of the poles. For a more complete description of this specific type of motor reference is had to my copending application Serial No. 632,567, filed January 4, 1957, from which FIG. 11 is taken, and now U.S. Patent No. 2,982,872, granted May 2, 1961.

As shown in FIG. 2, the control device includes a hollow cylindrical enclosure 23 with a knob 24 positioned above its top for controlling the first switch means and hence the continuous rotation of the motor and an inching knob 25 for controlling the second switch means and hence the incremental advance of the motor. The knob 24 is attached to a shaft 26 onto which is secured a cam 27 having two high points 28 diametrically opposite each other. The enclosure contains an intermediate mounting plate 29 and on the top of this mounting plate are positioned four switches 30–1 to 30–4 as shown in FIG. 3. Each switch 30 has an operating arm 31 which is positioned in the path of travel of the high points of the cam. The switches are mounted on the plate 29 to have the operating arms engaged by the cam to operate the switches 30–1 and 30–2 at the same time, while the switch 30–3 is actuated by counterclockwise rotation of the cam from the illustrated position, and the switch 30–4 is operated by clockwise movement of the cam from the illustrated position. Thus the knob 24 and hence the first switch means has three positions.

The inching knob 25 is attached to a shaft 32 which is specifically shown as being coaxial with the shaft 26 though, of course, it could be independently mounted and this shaft 32 terminates below the lower surface of the mounting plate 29. At its terminus there is secured a cam 33 which has a high point 34 which extends for approximately 135°. Four switches 35–1 to 35–4 (see FIG. 4) are mounted on the lower surface of the mounting plate in the manner shown and each has an operating arm 36 which is positioned to be engaged by the high point of the cam. The switch arms are positioned 90° apart and the cam can accordingly actuate two adjacent switches or only one switch. Thus the knob 25 and hence the second switch means has eight positions for each complete revolution thereof.

While a specific embodiment of the control device has been disclosed, it will be apparent that other well-known mechanical expedients for actuating the switches may be utilized to provide the necessary energization of the motor windings.

In the schematic diagram shown in FIG. 5, there is a pair of input lines 37—38 which are connectible to a source of alternating current. An on-off switch 39 and a fuse 40 are positioned in the line 37 and an indicator bulb 41 positioned across the input lines. There is also provided a transformer 42 having a primary 43 connected across the input lines 37, 38 and a secondary 44 connected to a full wave rectifier 45. A center tap on the secondary is connected by a lead 46 to the line 38. The switches 30–1 through 30–4 operated by the cam 27 are shown schematically in the same position as in FIG. 3, as are the switches 35–1 through 35–4 and cam 33 shown in FIG. 4.

The windings 21 of the motor are individually given the same reference numeral as in FIG. 1 and are connected to form a lower group 47 and an upper group 48 each having four serially connected windings, 21–1, 21–3, 21–5 and 21–7 and 21–2, 21–4, 21–6 and 21–8 respectively. It will be appreciated that the windings of the groups are alternately disposed in the casing 13 and that alternate windings of each group are oppositely wound. A lead 49 connects one end of the sets of windings in parallel to the line 38. The upper group of windings is connected through a lead 50 to a contact arm 51 of switch 30–2. This switch normally engages its contact 52 when the operating arm is not engaging the cam and the cam causes engagement between the arm 51 and the other contact 53. A lead 54 connects the contact 52 to a condenser 55 and resistor 56 and lead 57 connects the latter to contact 58 of switch 30–3. This switch is of the normally open type and its contact arm 59 is connected by a lead 60 to the input line 37.

The lower group of windings is connected by a lead 61 to contact arm 62 of switch 30–1. This switch has two contacts 63 and 64 and when the operating arm of this switch is not engaged by the cam 27 the contact arm 62 normally engages the contact 63 while the arm 62 and contact 64 are engaged when the cam high point engages the switch's operating arm. A lead 65 connects contact 63 to the lead 57. There is additionally provided a lead 66 connected to the contact arm 67 of switch 30–4 (which is of the normally open type) and to the input lead 37 while a lead 68 connects contact 69 of this switch to the lead 54.

The switches 35–1 through 35–4 of the second switch means are connected in the following manner: One lead 70 from one output of the rectifier 45 is connected to the contact arm 71 of normally open switch 35–2 and a lead 72 connects to lead 70 and to contact arm 73 of normally open switch 35–1. The other side of the rectifier 45 is connected by a lead 74 to contact arm 75 of switch 35–3 and a lead 76 connects lead 74 to contact arm 77 of switch 35–4. Contact 78 of switch 35–1 is connected by a lead 79 to contact 64 of switch 30–1 and a lead 80 connects contact 81 of switch 35–3 to the lead 79. Contact 82 of switch 35–2 is connected by a lead 83 to the contact 53 of switch 30–2 while a lead 84 connects contact 85 of switch 35–4 to the lead 83. A pair of spark suppressing resistors 86 such as "Thyrite" is connected as shown though other spark suppressors for the switches 35 may be utilized in their place.

In the operation of the driving unit, when it is desired to have the motor rotate continuously clockwise, the knob 24 of the first switch means is turned until the upper high point of the cam 27 engages the operating arm 67 of switch 30–4 to close this switch. Current then flows from the input lead 37, through lead 66 to contact arm 67, contact 69 and out the lead 68 to the contact 52 of switch 30–2. Since the cam is not engaging the operating arm of this switch, this contact 52 engages the contact arm 51 and current flows through lead 50 to the upper group of windings of the motor. In addition current also flows through the lead 54, the condenser 55 and resistor 56, lead 57, lead 65 to contact 63 of switch 30–1. Since the switch arm 62 of this switch 30–1 is not engaged by the cam, the contact arm will engage contact 63 and current flows through the lead 61 to the lower group of the windings. The common return lead 49 closes the circuit from the windings to the other output lead 38. The motor accordingly is revolved counterclockwise at its rated speed which may be 72 r.p.m. if energized with 60 cycle current, has eight poles and there are 50 teeth on the rotor and 48 teeth on the stator circle.

The windings 21–1 and 21–5 are wound in the same direction while the windings 21–3 and 21–7 are wound alike but in the opposite direction to the first thereby making poles 20–1 and 20–5 of the same polarity and poles 20–3 and 20–7 alike but of the opposite polarity. Similarly, poles 20–2 and 20–6 are alike and poles 20–4 and 20–8 are alike to each other but opposite to the poles 20–2 and 20–6. The condenser 55 and resistor 56 are in effect positioned across the leads 50 and 61 to make the two groups of windings be energized approximately 90° out of phase with each other.

If it is desired to have the motor shaft revolve at constant rated speed in the opposite direction, the knob 24 and cam 27 are turned so that the upper high point of the cam engages the contact arm 59 of switch 30–3 to close it. Current accordingly flows from the input line 37 through the elements 60, 59, 58, 57, 55, 56, 54, 52, 51 and 50 to the upper group of windings. Current also flows by lead 65 connected to the lead 57, through contact 63, contact arm 62 and lead 61 to the lower group of windings. The other input line 38 is connected to the lead 49 and hence to the winding.

The cam 27 is shown as it would be positioned when the motor is incrementally advanced by operation of the inching knob 25 or held stationary by maintaining selected windings energized. The windings, when the inching knob controls, are energized by unidirectional current as compared to alternating current used for continuously rotating the motor.

Each of the switches 35 is of the normally open type and controls the direct current from the rectifier 45 to the windings. Thus, if switch 35–1 is closed by the cam 33 (as shown in FIG. 5) current flows from the rectifier 45 through lead 70, lead 72, switch 35–1, lead 79 to contact 64 of switch 30–1, arm 62 and lead 61 to the lower group of windings. The lead 46 from the secondary tap to the line 38 completes the circuit to the lead 49. With switch 35–2 only closed by the cam 33, current flows from the rectifier 45 through lead 70, switch 35–2, lead 83, contact 53 and arm 51 of switch 30–2 and lead 50 to the upper group of windings. The circuit is completed as with switch 35–1 to the line 38. The circuit for switch 35–3 is the same as that for switch 35–1 only the connection is made to the other side of the rectifier by the lead 74 and lead 80 to the lead 79. The circuit for the switch 35–4 is the same as that for switch 35–2 with the connection being made to the other side of the rectifier by the lead 80 and lead 84 to the lead 83. It will be understood that switches 35–1 and 35–2 energize the winding with unidirectional current of the reverse polarity than that from switches 35–3 and 35–4.

It will be appreciated that the cam 33 in one complete revolution has eight operative positions. In position 1 shown the switch 35–1 is closed, and the rest of the switches are open; position 2 only the switches 35–1 and 35–2 are closed; position 3 only switch 35–2 is closed; position 4 switches 35–2 and 35–3 are closed; position 5 only switch 35–3 is closed; position 6 switches 35–3 and 35–4 are closed; position 7 only switch 35–4 is closed and position 8 switches 35–4 and 35–1 are closed. With the cam in positions 2, 4, 6 and 8 both groups of windings are energized while with positions 1 and 5 only the lower group of windings is energized and with positions 3 and 7 only the upper set of the windings is energized.

With the cam 33 in the position shown, only switch 35–1 is closed and hence windings 21–1, 21–3, 21–5 and 21–7 are energized which causes the poles 20–1 and 20–5 to be magnetized of one polarity, as for example N while poles 20–3 and 20–7 are the opposite, S. If the end cap 17 shown is polarized S by the permanent magnet of the rotor, then tooth 101 will be aligned with a tooth 102 on the pole 20–1 (see FIG. 1). In addition, the one tooth on the poles 20–3 and 20–7 which are polarized S, will be exactly out of alignment with the corresponding teeth of the stator. Upon rotation of the inching knob 25 to move the cam to position 2 in which both switches 35–1 and 35–2 are closed, the lower group of the windings will be maintained energized and the upper group will become energized, thereby making poles 20–2 and 20–6 N while 20–4 and 20–8 will be S. This causes the rotor to move until one tooth is aligned with a theoretical tooth located between the two poles 20–1 and 20–2, or in other words, the aligned tooth is positioned midway between the two poles 20–1 and 20–2. This advances the rotor ⅛ of a rotor tooth pitch.

Further movement of cam 33 to open switch 31 and maintain closed only switch 35–2 keeps the upper group of windings energized while deenergizing the lower group which causes an aligned tooth of the end cap to appear at pole 20–3 effecting a further ⅛ pitch tooth advancement of the rotor. Further rotation of cam 33 to position 4 to maintain switch 35–2 closed and close switch 35–3 causes the upper set of windings to be maintained energized and it energizes the lower set of windings with a unidirectional current of reversed direction so that now poles 20–3 and 20–7 are at N and poles 20–1 and 20–5 are S. This casues the aligned tooth of the rotor to be positioned between the two poles 20–2 and 20–3 thereby effectuating a further incremental advance of the rotor. It will be appreciated that continual rotation of the cam 33, its starting position through its eight positions, will cause the windings to be energized successively to make the rotor advance one-tooth pitch of the teeth of the rotor.

As an aid to understanding the polarity of the poles of the stator at the various positions of the cam 33, reference is made to FIG. 6. The upper left diagrammatical illustration illustrates the poles which are magnetized and their polarity at position 1 of the cam. The arrow 103 is indicative of the location of one of the two aligned teeth of the S end cap and in position 1 it is opposite the pole 20–1. The other aligned tooth is diametrically opposite the tooth 101. It will be appreciated that while the arrow 103 is shown making half a revolution for one complete rotation of the eight positions of the cam 33, that the rotor will only move one tooth pitch. This is so because the rotor just advances enough to have a tooth aligned in the position of the arrow but the tooth of the rotor which is aligned does not stay constant but shifts.

Merely maintaining the cam 33 in one of its positions will cause its associated winding to be energized by unidirectional current thereby magnetically holding the rotor in this position.

If the cam 33 is rotated counterclockwise, i.e. from position 1 to position 8, to position 7, etc., the rotor of the motor will likewise incrementally advance in a counterclockwise direction as opposed to clockwise movement of the rotor to clockwise movement of the cam 33.

If it is desired to rotate the motor continuously, the cam 27 is operated to close either switch 30–3 or 30–4. Upon returning the cam 27 to the inching position shown, the motor will stop with the aligned tooth positioned as determined by the position of the cam 33. Thus the motor will stop at a selected position with regard to the distance between teeth. It will be appreciated that while the cam 33 is shown as having a high point of about 135° thereby enabling operation with eight positions, this cam could have a high point of slightly less than 90 or approximately 180°.

The latter is effectively shown in FIG. 7 in which there is a cam 104 having a high point which causes it at all times to engage two of the switches 35. The effect of rotating this cam its four positions on the poles of the stator and the aligned tooth is shown in FIG. 8 and it will be understood that these positions are exactly the same as positions 2, 4, 6 and 8 of FIG. 6. Thus if positions 1, 3, 5 and 7 of cam 33 were skipped or not used, the result would be that shown in FIG. 8. Thus in this embodiment, both groups of windings are maintained energized at all times and operation of the second switch means from a first position to a second position causes one group of windings to be maintained energized with unidirectional current flowing in one direction while the other group of windings has the direction of its unidirectional current reversed.

Similarly FIG. 9 shows a cam 105 having a high point of less than 90° so that only one of the switches 35 can be operated at a time. This cam has four positions and their effect is diagrammatically shown in FIG. 10. The four positions shown are exactly the same as positions 1, 3, 5 and 7 of the cam 33. In this embodiment of the invention four sequential positions of the cam, first one group of windings is energized with unidirectional current flowing in one direction, then the second group is energized with unidirectional current flowing in the same direction, then the first group is energized with unidirectional current flowing in the reverse direction.

Shown in FIG. 1 is the pointer 14 cooperating with the scale 15. The scale 15 between large markings 15a is divided into eight segments. Each of these segments is equal to the amount of movement of the pointer 14 or shaft 12 for each position of the cam 33. It will be appreciated that since each position of the cam 33 advances the rotor ⅛ of a tooth pitch that with 50 teeth on the rotor, operation of the cam 33 divides one revolution of the rotor shaft into 400 incremental steps. While there is shown a motor having stator and rotor teeth which have slightly different pitch diameters, it will be appreciated that the control device of the present invention does not require such structure but may function with motors in which rotor and stator teeth have the same pitch diameter. In addition the number of teeth of the stator and rotor, whether equal or unequal may vary from the specific number shown without departing from the scope of the present invention.

It will accordingly be appreciated that there has been disclosed a driving unit having an electric motor and a control device which enables the motor to be either rotated continuously in either direction or inched, for minute increments of one rotation in either direction, or in which the motor may be held stationary at substantially any position thereof by the power of the motor.

Variations and modifications may be made within the scope of the claims and portions of the improvements may be used without others.

I claim:

1. A driving unit comprising an electric motor having a shaft, two annular end caps mounted axially spaced on the shaft, each being magnetically polarized with the polarity of one being different than the other, the periphery of the end caps being formed to provide evenly spaced teeth, a stator having at least eight poles evenly spaced about and radially aligned with the end caps, the periphery of the poles being formed with evenly spaced teeth, a winding for magnetizing each pole with alternate pole windings being serially connected to form two groups of windings, the poles of each group of windings forming two sets of oppositely positioned poles of unlike polarity with the poles of each set being alike, and at least a three position switch means connectible to a source of unidirectional current and to the windings for energizing the windings of one group with unidirectional current at one position of the switch means, at a second position of the switch means maintaining the one group energized and energizing the other group with unidirectional current and at a third position of the switch means deenergizing the one group of windings while maintaining the other group energized to thereby advance the shaft two increments.

2. The invention as defined in claim 1 in which the switch means includes a plurality of normally open switches coplanarly mounted and having operating arms spaced evenly about a circle, a rotatable shaft having a cam coaxially arranged with the switch mounting circle, said cam having a high point engageable with the operating arm and said high point being approximately one and a half times the distance between adjacent switch operating arms whereby said cam may engage to operate the operating arms of either one or two switches.

3. A driving unit comprising an electric motor and a control device; said motor having a shaft, two annular end caps mounted axially spaced on the shaft, each being magnetically polarized with the polarity of one being different than the other, the periphery of the end caps being formed to provide evenly spaced teeth, a stator having an even number of poles evenly spaced about and radially aligned with the end caps, the periphery of the poles being formed with evenly spaced teeth, a winding for each pole with alternate pole windings being serially connected to form two groups of windings; said control device including a three position switch means connectible to a source of alternating current and to the windings, phase shifting means interposed between the windings, a first position for connecting the source to one group of windings with in phase alternating current and the other set with advanced phase alternating current to continuously rotate the shaft in one direction, a second position for connecting the source to the windings to energize the other set with in phase alternating current and the one set with advanced phase alternating current to continuously rotate the shaft in the other direction, and a third position for disconnecting the alternating current to the windings, and for disconnecting the phase shifting means whereby each of said windings may be independently energized through the third position of the switch means with unidirectional current.

4. A driving unit comprising an electric motor and a control device; said motor having a shaft, two annular end caps mounted axially spaced on the shaft, each being magnetically polarized with the polarity of one being different than the other, the periphery of the end caps being formed to provide evenly spaced teeth, a stator having an even number of poles evenly spaced about and radially aligned with the end caps, the periphery of the poles being formed with evenly spaced teeth, a winding for each pole with alternate pole windings being serially connected to form two groups of windings; said control device including a three position switch means connectible to a source of alternating current and to the windings, phase shifting means interposed between the windings, a first position for connecting the source to one group of windings with in phase alternating current and the other group with advanced phase alternating current to continuously rotate the shaft in one direction, a second position for connecting the source to the windings to energize the other set with in phase alternating current and the one set with advanced phase alternating current to continuously rotate the shaft in the other direction, and a third position for disconnecting the alternating current to the windings, means connectible to a source of unidirectional current, and connections connecting the third position of the three position switch means to the means connectible to the unidirectional current for energizing the windings at the third position to magnetically hold the shaft stationary.

5. A driving unit comprising an electric motor and a control device; said motor having a shaft, two annular end caps mounted axially spaced on the shaft, each being magnetically polarized with the polarity of one being different than the other, the periphery of the end caps being formed to provide evenly spaced teeth, a stator having an even number of poles evenly spaced about and radially aligned with the end caps, the periphery of the poles being formed with evenly spaced teeth, a winding for each pole with alternate pole windings being serially connected to form two groups of windings; said control device including a three position switch means connectible to a source of alternating current and to the windings, phase shifting means interposed between the windings, a first position for connecting the source to one group of windings with in phase alternating current and the other group with advanced phase alternating current to continuously rotate the shaft in one direction, a second position for connecting the source to the windings to energize the other set with in phase alternating current and the one set with advanced phase alternating current to continuously rotate the shaft in the other direction, and a third position for disconnecting the alternating current to the windings, at least a two position switch means connectible to a source of unidirectional current and to at least one group of windings for in one position of the switch means directing unidirectional current in one direction through the one group of windings to magnetize the poles thereof and in the second position directing unidirectional current in the reverse direction through the one group of windings to oppositely magnetize the poles thereof, whereby the shaft is incrementally advanced.

6. A driving unit comprising an electric motor and a control device; said motor having a shaft, two annular end caps mounted axially spaced on the shaft, each being magnetically polarized with the polarity of one being different than the other, the periphery of the end caps being formed to provide evenly spaced teeth, a stator having an even number of poles evenly spaced about and radially aligned with the end caps, the periphery of the poles being formed with evenly spaced teeth, a winding for each pole with alternate pole windings being serially connected to form two groups of windings; said control device including a three position switch means connectible to a source of alternating current and to the windings, phase shifting means interposed between the windings, a first position for connecting the source to one group of windings with in phase alternating current and the other group with advanced phase alternating current to continuously rotate the shaft in one direction, a second position for connecting the source to the windings to energize the other set with in phase alternating current and the one set with advanced phase alternating current to continuously rotate the shaft in the other direction, and a third position for disconnecting the alternating current to the windings, at least a two position switch means connectible to a source of unidirectional current and separately to each group of windings, one position of the switch directing unidirectional current in one direction through one group and unidirectional current of the reverse direction through the other group and in the second position for directing unidirectional current of the reverse direction through the one group and unidirectional current of the one direction through the other group to thereby incrementally advance the shaft.

7. A driving unit comprising an electric motor and a control device; said motor having a shaft, two annular end caps mounted axially spaced on the shaft, each being magnetically polarized with the polarity of one being different than the other, the periphery of the end caps being formed to provide evenly spaced teeth, a stator having an even number of poles evenly spaced about and radially aligned with the end caps, the periphery of the poles being formed with evenly spaced teeth, a winding for each pole with alternate pole windings being serially connected to form two groups of windings; said control device including a three position switch means connectible to a source of alternating current and to the windings, phase shifting means interposed between the windings, a first position for connecting the source to one group of windings with in phase alternating current and the other group with advanced phase alternating current to continuously rotate the shaft in one direction, a second position for connecting the source to the windings to energize the other set with in phase alternating current and the one set with advanced phase alternating current to continuously rotate the shaft in the other direction, and a third position for disconnecting the alternating current to the windings, at least a three position switch means connectible to a source of unidirectional current and to both groups of windings, one position of the switch directing unidirectional current in one direction through one group and none through the other, a second position of the switch directing unidirectional current through both groups of windings, and a third position directing unidirectional current to the reverse direction through the one group and none to the other group to thereby incrementally advance the shaft.

8. The invention as defined in claim 3 in which the switch means includes four switches and a rotatable cam having diametrically opposite high points, two of said switches being mounted oppositely aligned to both be operated at the third position of the switch means, a switch being disposed on one side and a switch being disposed on the other side of one of said two switches whereby movement in one direction from the third position operates one switch only while movement in the opposite direction from the third position operates the other switch only.

9. A driving unit comprising an electric motor having a shaft, two annular end caps mounted axially spaced on the shaft, each being magnetically polarized with the polarity of one being different than the other, the periphery of the end caps being formed to provide evenly spaced teeth, a stator having at least two sets of oppositely positioned poles evenly spaced, surrounding and radially aligned with the end caps, the periphery of the poles being formed with evenly spaced teeth, a winding for magnetizing each pole, and at least a two position switch means connectible to a source of unidirectional current and to the windings for directing unidirectional current to the windings for magnetizing the poles of one set of a reverse polarity than the poles of the other set in one position of the switch means and in the second position for reversing the direction of unidirectional current to the windings to reverse the magnetic polarity of the poles, thereby incrementally advancing the shaft, and in which the switch means includes a plurality of normally open switches coplanarly mounted and having operating arms spaced evenly about a circle, a rotatable shaft having a cam coaxially arranged with the switch mounting circle, said cam having a high point engageable with the operating arm and said high point being less than the distance between two adjacent switch operating arms.

10. A driving unit comprising an electric motor having a shaft, two annular end caps mounted axially spaced on the shaft, each being magnetically polarized with the polarity of one being different than the other, the periphery of the end caps being formed to provide evenly spaced teeth, a stator having at least four poles evenly spaced about and radially aligned with the end caps, the periphery of the poles being formed with evenly spaced teeth, a winding for magnetizing each pole with alternate pole windings being serially connected to form two groups of windings, and at least a two position switch means connectible to a source of unidirectional current and to each group of windings for directing unidirectional current of the same direction to the windings of both groups for magnetizing the poles at one position of the switch and at the other position of the switch maintaining the same direction of unidirectional current to one group of windings while directing a unidirectional current of the reverse direction through the other group of windings to thereby incrementally advance the shaft, and in which the switch means includes a plurality of normally open switches coplanarly mounted and having operating arms spaced evenly about a circle, a rotatable shaft having a cam coaxially arranged with the switch mounting circle, said cam having a high point engageable with the operating arm and said high point being slightly less than twice the distance between adjacent switch operating arms whereby said cam engages to operate at all positions the operating arms of two switches.

References Cited in the file of this patent

UNITED STATES PATENTS

| | | |
|---|---|---|
| 2,249,029 | Mullerheim | July 15, 1941 |
| 2,589,999 | Feiertag et al. | Mar. 18, 1952 |
| 2,651,733 | Stark | Sept. 8, 1953 |
| 2,706,270 | Steele | Apr. 12, 1955 |
| 2,790,124 | Eisele | Apr. 23, 1957 |
| 2,809,337 | Welch | Oct. 8, 1957 |

UNITED STATES PATENT OFFICE
CERTIFICATE OF CORRECTION

Patent No. 3,077,555                 February 12, 1963

Gustav O. Fredrickson

It is hereby certified that error appears in the above numbered patent requiring correction and that the said Letters Patent should read as corrected below.

In the grant, line 1, for "Gustav O. Frederickson" read -- Gustav O. Fredrickson --; column 1, line 59, for "motor" read -- rotor --; column 5, line 64, for "casues" read -- causes --; column 10, under UNITED STATES PATENTS line 63, for "2,809,337 Welch----Oct. 8, 1957" read -- 2,809,335 Welch----Oct. 8, 1957 --.

Signed and sealed this 24th day of September 1963.

(SEAL)
Attest:

ERNEST W. SWIDER
Attesting Officer

DAVID L. LADD
Commissioner of Patents